United States Patent [19]

Eagan

[11] Patent Number: 5,370,408
[45] Date of Patent: Dec. 6, 1994

[54] BABY STROLLER OR BABY CARRIAGE BRAKE SYSTEMS

[76] Inventor: Chris S. Eagan, 670 Eldorado La., Las Vegas, Nev. 89123

[21] Appl. No.: 159,487

[22] Filed: Nov. 26, 1993

[51] Int. Cl.⁵ .............................................. B62B 9/08
[52] U.S. Cl. .............................. 280/33.994; 280/642; 280/47.38; 188/20
[58] Field of Search ............... 280/47.38, 33.994, 647, 280/650, 657, 658; 188/12, 19, 20, 2 D; 267/292, 73, 69, 153, 74, 257, 258

[56] References Cited

U.S. PATENT DOCUMENTS

| | | | |
|---|---|---|---|
| 2,425,574 | 8/1947 | Stewack | 188/20 |
| 3,370,841 | 2/1968 | Werner et al. | 267/73 |
| 4,116,464 | 9/1978 | Haley | 280/33.994 |
| 4,618,033 | 10/1986 | Kassai | 188/20 |

FOREIGN PATENT DOCUMENTS 1377168 12/1974 United Kingdom .................. 188/20

*Primary Examiner*—Karin L. Tyson
*Assistant Examiner*—Anne Marie Boehler
*Attorney, Agent, or Firm*—Philip D. Junkins

[57] ABSTRACT

An improved brake system for wheeled baby carriers, including baby strollers and baby carriages, whereby when the carrier is at rest and not being pushed by an attendant person, the wheels of the carrier are automatically locked so that accidental rolling movement thereof is inhibited. In accordance with the invention the push handle of the carrier has associated therewith a brake release handle or bar which is interconnected by a brake release cable to a brake shift bar mechanically connected to the brake levers associated with the rear wheels of the carrier. The brake shift bar is resiliently biased by one or more biasing elastic bands or springs to a position which causes the brake levers to normally lock the rear wheels against rotation. When the carrier attendant desires to push the carrier the brake release handle or bar is moved to a wheel unlock position proximate the push handle by hand gripping force of the attendant with the result that the release cable moves the brake shift bar, and connected brake levers, in opposition to the biasing bands or springs, to their wheel unlocked position. Upon freeing the brake release handle or bar from the hand gripping force of the carrier attendant such handle or bar is returned to its wheel lock position by the biasing force of the biasing bands or springs and the brake levers are moved by the brake shift bar to their wheel locked position to prevent accidental movement of the carrier.

6 Claims, 2 Drawing Sheets

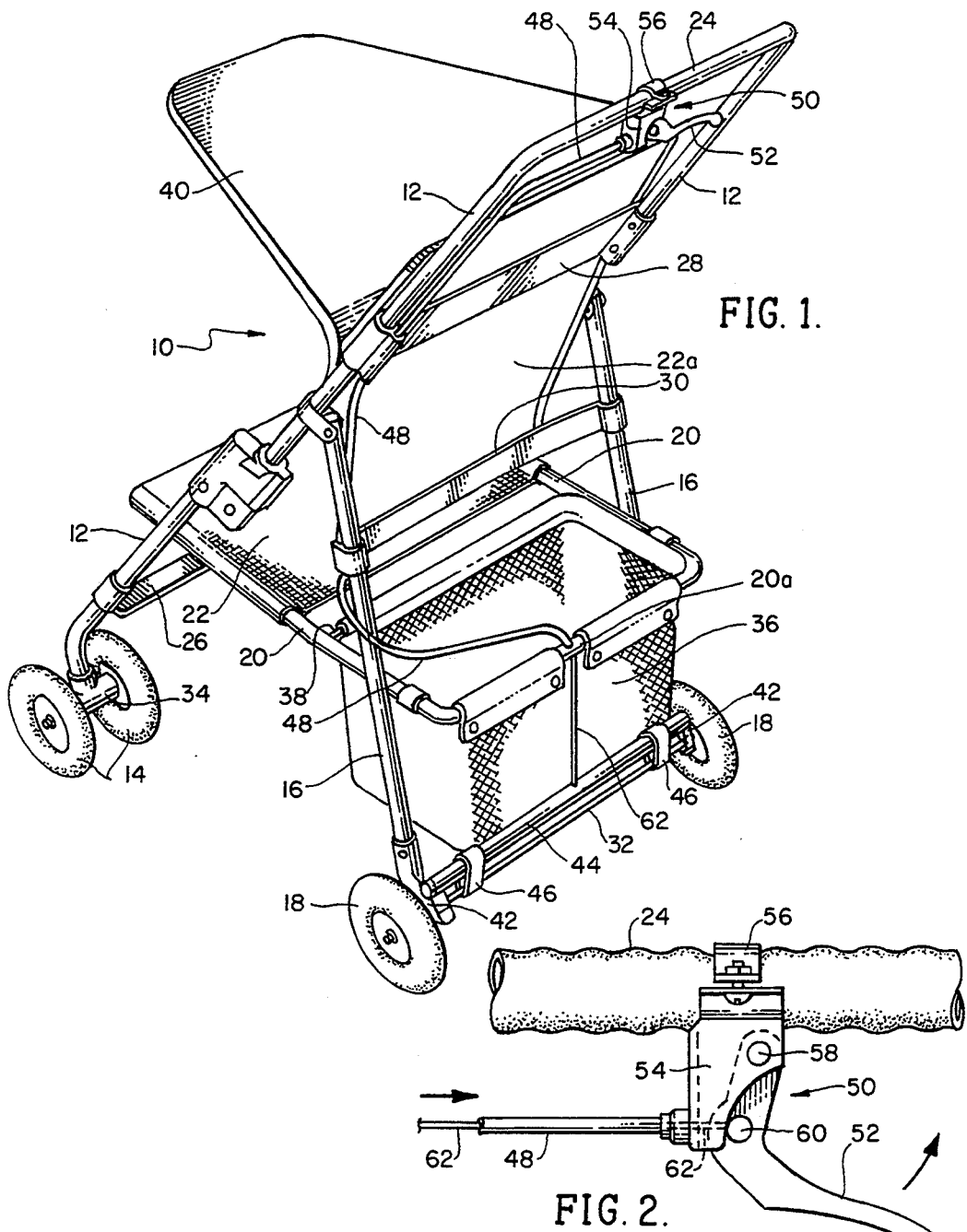
FIG. 1.
FIG. 2.
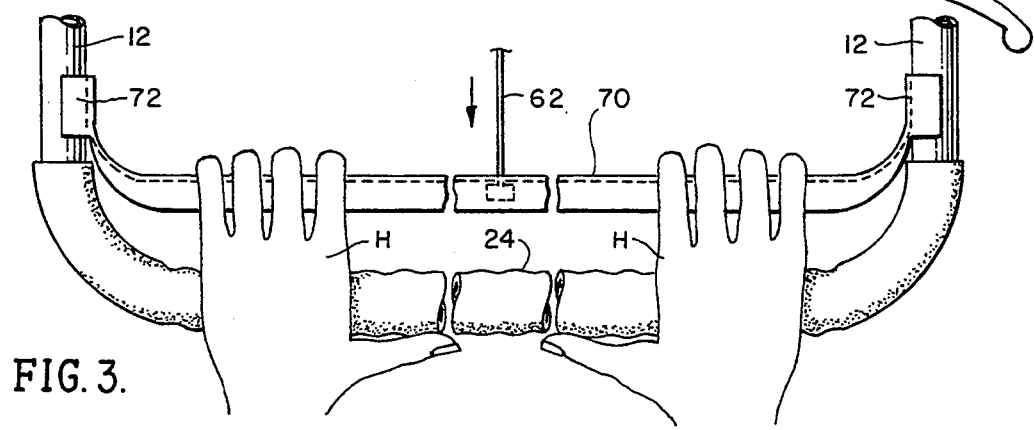
FIG. 3.

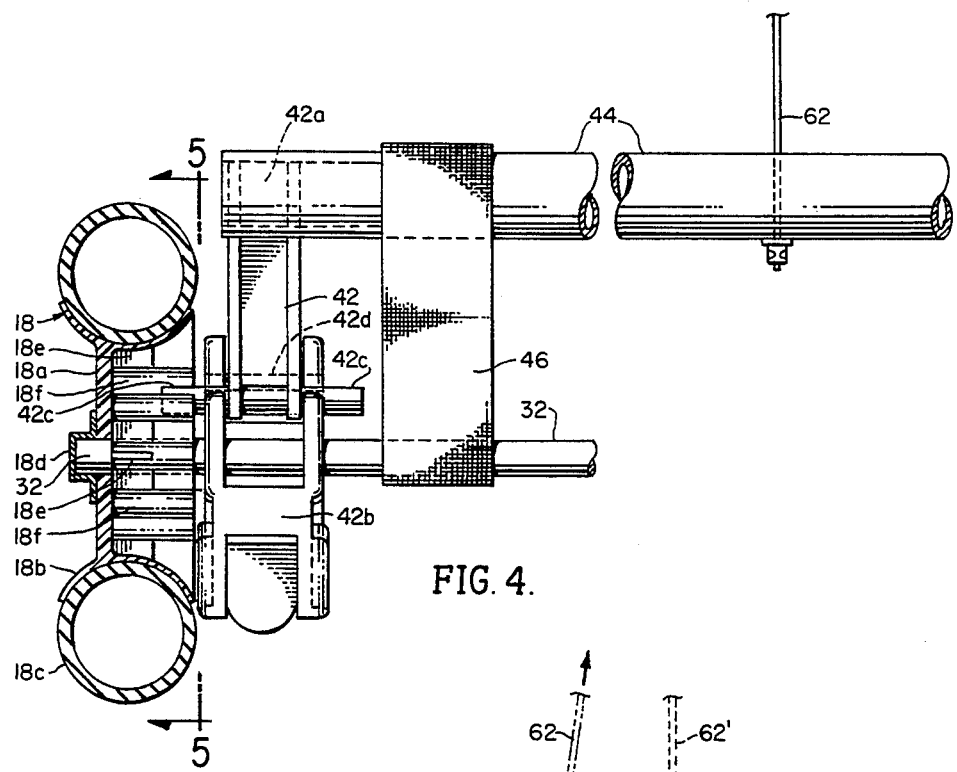
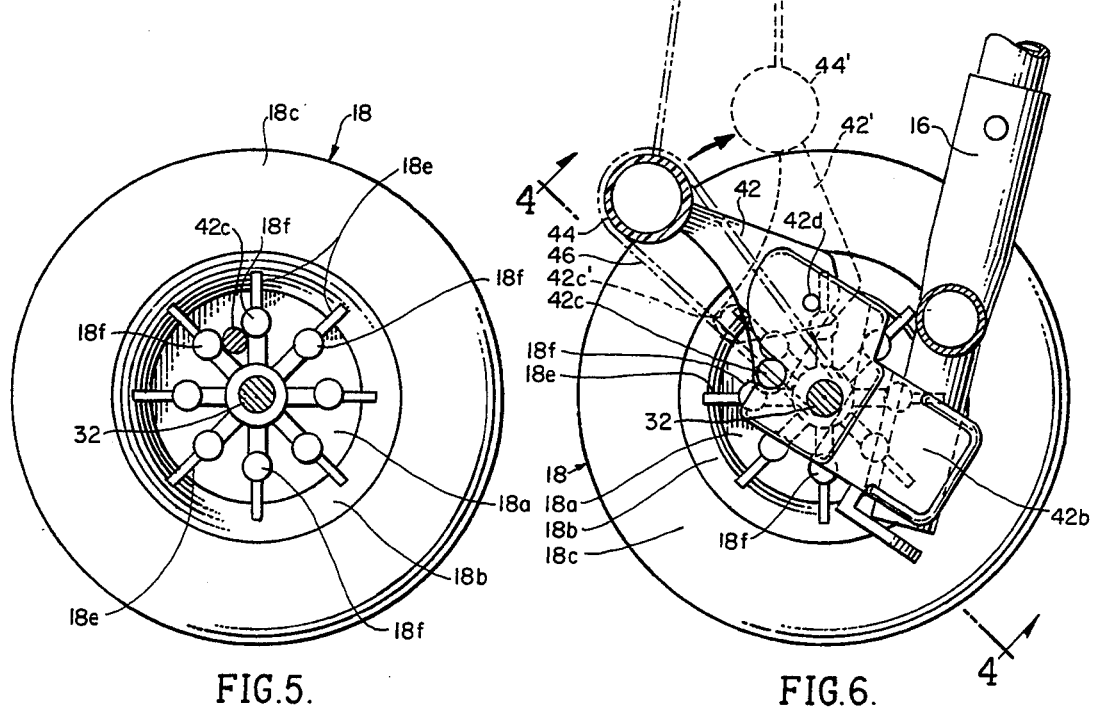

BABY STROLLER OR BABY CARRIAGE BRAKE SYSTEMS

BACKGROUND OF THE INVENTION

1. Field of the Invention

The present invention relates to baby strollers and baby carriages. More particularly, the invention relates to brake systems for baby strollers and baby carriages whereby when the strollers or carriages are at rest, and not being pushed by an attendant person, the wheels of the stroller or carriage are automatically locked so that accidental rolling movement thereof is inhibited.

2. Description of the Prior Art

Baby strollers and baby carriages of both foldable and non-foldable types are well known and are provided with manual push handles affixed to the body frame thereof. The rear wheels or wheel sets of most modern-day strollers and carriages are equipped with wheel brakes of friction or interlocking types which must be purposefully engaged or disengaged by the attendant person. Thus, the attendant person wishing to park the modern-day stroller or carriage, and inhibit its rolling movement, is usually required to depress by foot actuation a brake lever associated with each rear wheel or wheel set on each side of the stroller or carriage. Before again pushing the stroller or carriage the attendant person must release the brake mechanisms by lifting each brake lever— usually by engaging the underside of the lever with the toe portion of one's foot. In some instances the stroller or carriage attendant forgets to set the wheel brakes or loses control of the stroller or carriage thereby jeopardizing the safety of the baby or small child carried therein.

It is a general object of the present invention to provide baby strollers and baby carriages with a wheel brake system which automatically inhibits rolling movement of the stroller or carriage when the attendant person's hands are purposefully or accidentally out of holding or gripping contact with the push handle of the stroller or carriage.

It is a further object of the invention to provide a wheel brake system for baby strollers and baby carriages which automatically actuates the wheel brake mechanisms of the stroller or carriage when the hands of the attendant person are not in gripping contact with the push handle of the stroller or carriage, It is another object of the invention to provide a wheel brake system for baby strollers and baby carriages which may be retro-fitted to strollers and carriages which have foot actuated brake levers associated with the rear wheels whereby such levers are actuated to engage the wheels to inhibit rolling movement when the hands of the attendant person are not in gripping contact with the push handle of the stroller or carriage.

Other objects and advantages of the invention will be apparent from the following summary and description of the invention taken together with the accompanying drawing figures.

SUMMARY OF THE INVENTION

The present invention relates to novel brake systems for baby strollers and baby carriages whereby when such strollers or carriages are not being pushed by an attendant person the wheels are automatically locked so that unintentional or accidental rolling movement thereof is inhibited and the safety of the baby or small child carried therein is assured. The modern-day baby stroller and baby carriage is most often equipped with rear wheel brakes which must be purposefully and individually engaged and released by the attendant person, usually by foot or hand actuation of a brake lever associated with each rear wheel or wheel set.

In accordance with the present invention there is associated with the push handle of the stroller or carriage a shiftable brake release bar or grip lever which disengages the wheel brake mechanisms only when the hands or hand of the attendant person is in gripping contact with the brake release bar and push handle or with the grip lever and push handle. The brake release bar or grip lever is interconnected by a brake release cable to brake shift means associated with the brake levers of the wheels or wheel sets.

The break shift means is normally biased by mechanical means (elastic bands, springs, etc.) to a position whereat the brake levers engage the wheels and preclude their rotation. When the brake release bar or grip lever is hand gripped by the attendant person to the push handle of the stroller or carriage the brake shift means is moved via the brake release cable against its biasing means and the brake levers associated with the wheels or wheel sets are disengaged by the brake shift means whereby the wheels are free to rotate with pushing or pulling movement of the stroller or carriage. When the hands of the attendant person are removed from a gripping position with respect to the brake release bar and push handle or with respect to the grip lever and push handle of the stroller or carriage, the biasing means associated with the brake shift means automatically forces the latter into its normal biased position with attendant locking of the wheels of the stroller or carriage by their respective brake levers.

The brake systems of the present invention may be provided as original equipment with new baby strollers or baby carriages or provided as retro-fit equipment for installation by stroller or carriage owners. Where the brake systems are provided as original equipment the brake release cable extending from the brake release bar or grip lever (mounted to the push handle) may be enclosed within the push handle, one of the tubular members or rods supporting the push handle, and one of the tubular members or rods forming the rear frame of the stroller or carriage and to which the rear wheels or wheel sets and brake shift means are mounted. As retro-fit equipment the brake release cable is merely band mounted to the push handle, to one of the push handle support members, and to one of the rear frame members.

BRIEF DESCRIPTION OF THE DRAWING FIGURES

FIG. 1 is a perspective view of a typical baby stroller on which has been installed a retro-fit brake system in accordance with the invention with the brake shift means of the system interconnected by a brake release cable to a grip lever mounted to the horizontal push handle of the stroller;

FIG. 2 is an enlarged partial front elevation view of the push handle of the stroller of FIG. 1 showing in greater detail the structure of the grip lever mounted to such handle;

FIG. 3 is a partial top view of the horizontal push handle of the stroller of FIG. 1 to which has been mounted a moveable brake release bar for gripping actuation by an attendant person and accompanying disengagement (via a brake release cable) of the brake shift means (not shown) of the brake system of the invention;

FIG. 4 is an enlarged partial elevation view of a lever actuated brake associated with a rear wheel (shown in section) of the stroller of FIG. 1 taken on line 4—4 of FIG. 6 with the brake shift means of the invention shown in its brake locked position;

FIG. 5 is a right side elevation view of the stroller wheel and brake of FIG. 4 taken on line 5—5 of FIG. 4; and FIG. 6 is a right side elevation view of the stroller wheel and brake and the brake shift means of FIG. 4 of the invention showing the brake shift means via solid line presentation in its brake locked position and showing the brake shift means via dashed line presentation in its brake released position.

DETAILED DESCRIPTION OF PREFERRED EMBODIMENTS OF THE INVENTION

The present invention relates to novel brake systems for baby strollers and baby carriages whereby when such baby carriers are not being pushed by an attendant person the wheels are automatically locked so that unintentional or accidental rolling movement thereof is inhibited and the safety of the baby or small child carried therein is assured. The detailed descriptions of the embodiments of the brake systems of the invention, although applicable to both baby strollers and baby carriages, are presented in the context of baby strollers. Thus, there is illustrated generally in FIG. 1 a perspective rear view of a typical baby stroller 10. The stroller 10 is basically comprised of: a pair of forward legs 12 each having a set of front wheels 14; a pair of rear legs 16, pivotally affixed at their respective upper ends to the forward legs, each having a rear wheel 18; seat supporting rods 20 for supporting a seat 22; and a horizontal push handle 24 connected at its ends to the upper end of each of the forward legs 12.

Cross member 26 interconnects and appropriately spaces the forward legs 12. Cross member 26 also acts as a foot rest for a baby carried by the stroller. Flexible straps 28 and 30 extend between the forward legs 12 and rear legs 16, respectively, and are affixed to and support the seat back 22a. Rear wheel axle 32 interconnects and appropriately spaces the rear legs 16 at their lower ends. The sets of forward wheels 14 are pivotally connected via axle brackets 34 to their respective forward legs 12. A rear basket 36, supported via rear extensions of the seat supporting rods 20 and their connecting horizontal cross rod 20a and by a forward cross rod 38 (extending between seat rods 20), is provided as carrying means for baby supplies and toys. A shade cover 40, supported by the forward legs 12, is provided to shield the baby from sun exposure.

The typical stroller includes brake levers 42 individually associated with the rear wheels of the stroller. Such levers are manually and individually shiftable from an upward position with the wheels free to rotate to a downward position with the wheels locked against rotation. In accordance with the present invention, there is provided a brake shift bar 44 which extends across the rear of the stroller in proximity to the rear wheel axle 32 and is connected to the brake levers 42 associated with the rear wheels 18. The brake shift bar 44 is normally held in relatively close proximity, via extensible bias means 46, to the rear wheel axle 32 so that the brake levers 42 are held in their downward position locking the rear wheels 18 against rotation. The biasing means 46, as shown in FIG. 1 are comprised of elastic bands extending around and between the brake shift bar 44 and the wheel axle 32. Alternatively, the bias means 46 may be comprised of springs or other extensible tension providing means.

As shown in FIG. 1, the brake shift bar 44 is interconnected via cable means 48 to a brake release mechanism 50 which includes a hand lever 52. The brake release mechanism 50 is mounted via bracket 54 and mounting band 56 to the horizontal push handle 24 of the stroller 10, as shown in greater detail in FIG. 2. The hand lever 52 is pivoted to the bracket 54 via pivot connector 58 and is interconnected at pull mount 60 to the internal pull wire 62 of cable means 48. The internal pull wire 62 of cable means 48 is connected at its lower terminal end to the brake shift bar 44. Thus, when the hand lever 52 is pivoted to the push handle 24 (and held in close proximity thereto) the pull wire 62 lifts the brake shift bar 44 (against the tension force of the bias means 46) which moves the brake levers 42 to their upward position freeing the rear wheels to rotate as the stroller is pushed by an attendant person. If the hand lever 52 is released by the attendant person the bias means 46 immediately pulls the brake shift bar 44 into close proximity to the rear wheel axle 32 and the shift bar thereby moves the brake levers 42 to their downward position with the stroller's rear wheels locked against rotation.

In FIG. 3 there is shown, in a partial top view, an alternative embodiment of the present invention. Thus, the horizontal push handle 24 of the stroller (not shown) has mounted thereto a moveable brake release bar 70 for gripping actuation by the hands H of an attendant person. The gripping movement of the release bar 70 to the push handle 24, with accompanying pull movement of the pull wire 62 interconnected through cable 48 (not shown) to the brake shift bar 44 (not shown), frees the rear wheels of the stroller to rotate as described heretofore with respect to FIGS. 1 and 2. The brake release bar 70 includes end brackets 72 which partially surround and slip-grip the upper ends of the forward legs 12 of the stroller. These brackets permit sliding action of the brake release bar 70 toward the push handle 24 (as dictated by hand gripping of the brake release bar to the push handle) and away from the handle (as dictated by the pull wire and tension force applied to the interconnected brake shift bar by the bias means as described with respect to FIGS. 1 and 2). Thus, when the brake release bar 70 is freed from the gripping hands of the person pushing the stroller the brake system of the invention automatically locks the rear wheels of the stroller thereby inhibiting rolling movement of the stroller.

Referring now to FIG. 4 there is shown, in an enlarged partial elevation view, a lever actuated brake of the type typically associated with a rear wheel 18 (shown in section) of the stroller of FIG. 1 (taken on line 4—4 of FIG. 5) with the brake shift means of the invention shown in its brake-locked position, i.e., the brake lever 42 held in its downward position by the bias means 46. The bias means 46 is comprised of an elastic band extending around and between the brake shift bar 44 and the wheel axle 32. The wheel 18 is comprised of a hub plate 18a, tire support rim 18b and tire 18c, all of known design and structure. The wheel 18, via wheel hub plate 18a, is mounted to an end of wheel axle 32 and held thereon by a cap 18d of known type. The hub plate 18a includes inwardly projecting, annularly spaced, vanes 18e (see both FIGS. 4 and 5). Each vane has associated therewith a further inwardly projecting brake nubs 18f. The brake lever 42, affixed at it end portion 42a to brake shift bar 44, is pivoted to wheel axle 32 through lever bracket 42b and includes projecting brake pinion 42c. The brake pinion 42c extends through the bracket 42b toward the hub plate 18a of the wheel 18 and, as shown in FIG. 4, rests between two of the brake hubs 18f thereby locking the wheel against rotation.

The locking position of brake pinion 42c between two adjacent brake nubs 18f is particularly shown in FIG, 6 wherein the brake lever 42 is shown in solid line form in its downward position, i.e,, the position of such lever as shown in FIG. 4. The unlocked position of the brake lever 42 is shown in FIG. 6 as element 42' in phantom outline with the position of the associated brake pinion 42c also shown in phantom outline as element 42c'. The position of the brake lever 42 is dictated by brake shift bar 44 which is shown in solid line form in FIG, 6 in its downward position and shown as element 44' in its upward position in phantom outline. The downward and upward positions of the pull wire 62 (affixed to brake shift bar 44) are also shown FIG. 6 with such wire indicated as 62' when the brake lever 42 is in its upward position as element 42'. It is to be noted that, as shown in FIG. 6, the rear leg 16 of the stroller assembly is appropriately affixed to the wheel assembly 18 via lever bracket 42b.

It is to be understood that the stroller (or baby carriage) brake system of the present invention can be applied to a wide variety of stroller and carriage structures and configuration as retro-fit equipment. The brake system of the invention can also be incorporated as original equipment in stroller and carriage structures with the control cable means 48 and its internal pull wire 62 fed through the push handle 24, a front leg 12 and a rear leg 16. Further, the present brake system can be employed in other wheeled pushcarts having push handles, including shopper pushcarts commonly used in supermarkets, department stores and convenience stores. When employed in shopper pushcarts such carts may be serially aligned and interstacked for pushing by a store attendant because the brake release bar (of the type shown as bar 70 in FIG. 3 of the drawings) of each cart will be moved to its brake release position by the preceding cart in the interstacked alignment. While preferred embodiments of the present invention have been disclosed herein and illustrated in the accompanying drawing figures, it will be apparent to one skilled in the art that many variations and modification may be made without departing from the scope and spirit of the invention as defined by the following claims.

What is claimed is:

1. An improved brake system for baby strollers, baby carriages and shopper pushcarts having a frame including a forward pair of legs having front wheels rotatably mounted to lower ends thereof and a rear pair of legs having rear wheels rotatably mounted to lower ends thereof and interconnected by a common wheel axle, a carrier portion mounted to upper portions of said legs, a push handle, and brake levers interacting with the rear wheels, wherein the improvement comprises:
   a) a brake shift bar mechanically interconnected to said brake levers and extending in spaced relationship parallel to said common wheel axle for shifting said brake levers from a wheel locked position to a wheel unlocked position;
   b) biasing means associated with said brake shift bar and comprised of at least one elastic band member extending between said shift bar and said wheel axle to resiliently maintain said shift bar and said brake levers in the wheel locked position;
   c) brake release means associated with said push handle and moveable toward said handle to a brake release position and movable away from said handle to a brake lock position; and
   d) a brake release cable interconnecting said brake shift bar with said brake release means whereby upon hand forced movement of said brake release means toward said push handle said cable moves said brake shift bar to said wheel unlocked position in opposition to said biasing means and upon hand forced release of said brake release means said release means is moved away from said push handle by said cable and interconnected brake shift bar through the force of said biasing means to return said brake levers to their wheel locked position.

2. The improved brake system for baby strollers, baby carriages and shopper pushcarts as claimed in claim 1 wherein the brake release means associated with the push handle comprises a pivotal hand grip lever pivoted to said push handle and including an offset pin mount for attachment of said grip lever to an end of said brake release cable whereby when said grip lever is pivotally moved to said push handle said brake shift bar shifts said brake levers to said wheel unlocked position.

3. The improved brake system for baby strollers, baby carriages and shopper pushcarts as claimed in claim 1 wherein the brake release means associated with said push handle comprises a brake release bar mounted in movable spaced parallel alignment with said push handle, said brake release bar being interconnected to an end of said brake release cable whereby upon hand gripping movement of said release bar to said push handle said brake shift bar shifts said brake levers to said wheel unlocked position.

4. An improved brake system for a wheeled baby carrier having: a frame including a forward pair of legs including wheels rotatably mounted to the lower ends thereof and a rearward pair of legs including wheels rotatably mounted to an axle extending between the lower ends thereof, a baby carrier assembly mounted to upper portions of said forward legs and said rearward legs, a horizontal push handle mounted to upper extended portions of one pair of said legs, and brake levers associated with the wheels of said rearward pair of legs, wherein the improvement comprises:
   a) a brake shift bar mechanically interconnected to said brake levers and extending in spaced relationship parallel to the wheel axle extending between lower ends of said rearward legs for shifting said brake levers from a wheel locked position to a wheel unlocked position;
   b) biasing means associated with said brake shift bar and comprised of at least one elastic band member extending between said shift bar and said wheel axle to resiliently maintain said shift bar and said brake levers in the wheel locked position;
   c) brake release means associated with said horizontal push handle and movable by hand gripping force of a person attending said carrier toward said handle to a brake release position and movable away from said handle to a brake lock position upon the removal of said hand gripping force of the person attending said carriage; and d) a brake release cable interconnecting said brake shift bar with said brake release means whereby upon hand forced movement of said brake release means toward said push handle said cable moves said brake shift bar to said wheel unlocked position in opposition to said biasing means and upon hand forced release of said brake release means said release means is moved away from said push handle by said cable and interconnected brake shift bar through the force of said biasing means to return said brake levers to their wheel locked position.

5. The improved brake system for a wheeled baby carrier as claimed in claim 4 wherein the brake release means associated with said push handle comprises a pivotal hand grip lever pivoted to said push handle and including an offset pin mount for attachment of said grip to an end of said brake release cable whereby when said grip lever is pivotally moved to said push handle by the hand gripping force of the person attending said carrier said brake shift bar shifts said brake levers to said wheel unlocked position.

6. The improved brake system for a wheeled baby carrier as claimed in claim 4 wherein the brake release means associated with said push handle comprises a brake release bar mounted in movable spaced parallel alignment with said push handle, said brake release bar being interconnected to an end of said brake release cable whereby upon hand gripping movement of said release bar to said push handle said brake shift bar shifts said brake levers to said wheel unlocked position.

* * * * *